Figure 1:
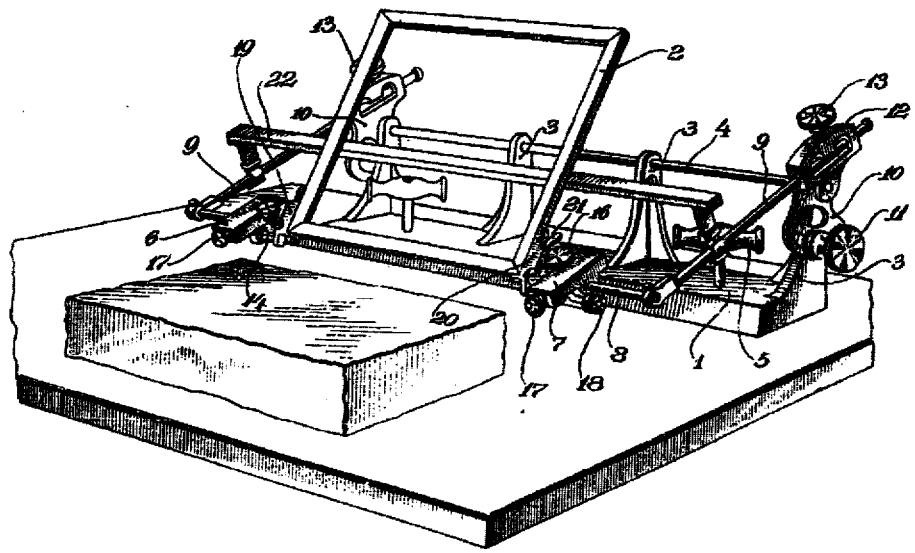

No. 873,029. PATENTED DEC. 10, 1907.
B. DAY.
FILM FRAME REST FOR PRINTING FILM FRAMES.
APPLICATION FILED AUG. 14, 1907.

3 SHEETS—SHEET 1.

Witnesses:
N. C. Maggeson
E. S. Ferris

Inventor
Benjamin Day
By his Attorney
Wm. F. Bissing

No. 873,029. PATENTED DEC. 10, 1907.
B. DAY.
FILM FRAME REST FOR PRINTING FILM FRAMES.
APPLICATION FILED AUG. 14, 1907.
3 SHEETS—SHEET 2.
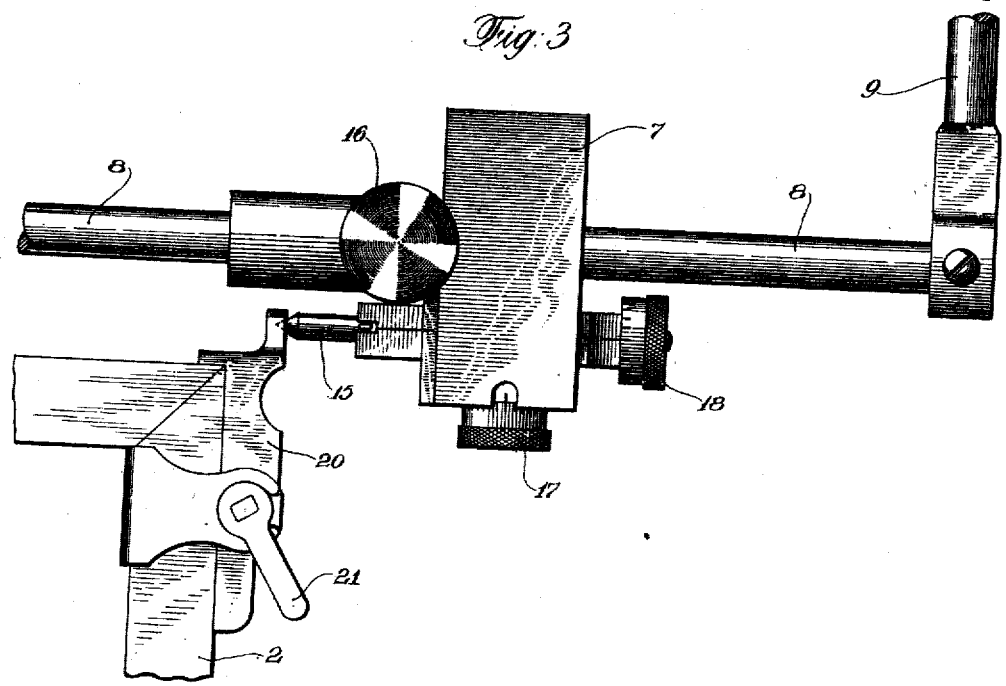
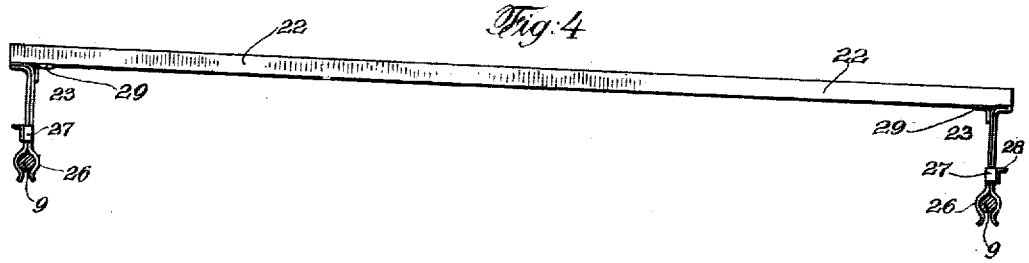
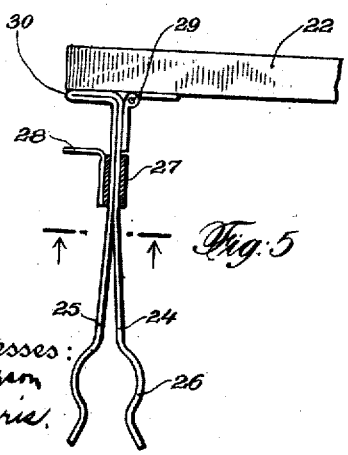
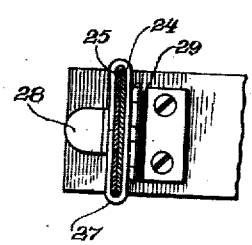
Witnesses:
W. C. Mazzron
E. S. Ferris
Benjamin Day, Inventor
By his Attorney
Wm. F. Bissing No. 873,029.  
PATENTED DEC. 10, 1907.

B. DAY.

FILM FRAME REST FOR PRINTING FILM FRAMES.

APPLICATION FILED AUG. 14, 1907.

3 SHEETS—SHEET 3.

Witnesses:

Inventor
Benjamin Day
By his Attorney
Wm. F. Bissing.

UNITED STATES PATENT OFFICE.

BENJAMIN DAY, OF WEST HOBOKEN, NEW JERSEY.

FILM-FRAME REST FOR PRINTING-FILM FRAMES.

No. 873,029.        Specification of Letters Patent.        Patented Dec. 10, 1907.

Application filed August 14, 1907. Serial No. 388,482.

*To all whom it may concern:*

Be it known that I, BENJAMIN DAY, a citizen of the United States, residing at West Hoboken, in the State of New Jersey, have invented a new and useful Improvement in Film-Frame Rests for Printing-Film Frames, of which the following is a specification.

My invention relates to film frame rests for mounted printing-films, the latter now having come into wide use in connection with devices for shading drawings on stone, zinc and the like.

One of the objects of my invention is to provide a rest for printing-film frames which will support the frame when turned back from the work without jarring the printing-film out of register.

Another object of my invention is to provide a film frame rest for printing-films which will support the film frame when turned back from the work, without injury to the film.

With the above and other objects in view, my invention consists in the parts, improvements and combinations more fully pointed out hereinafter.

Figure 2:
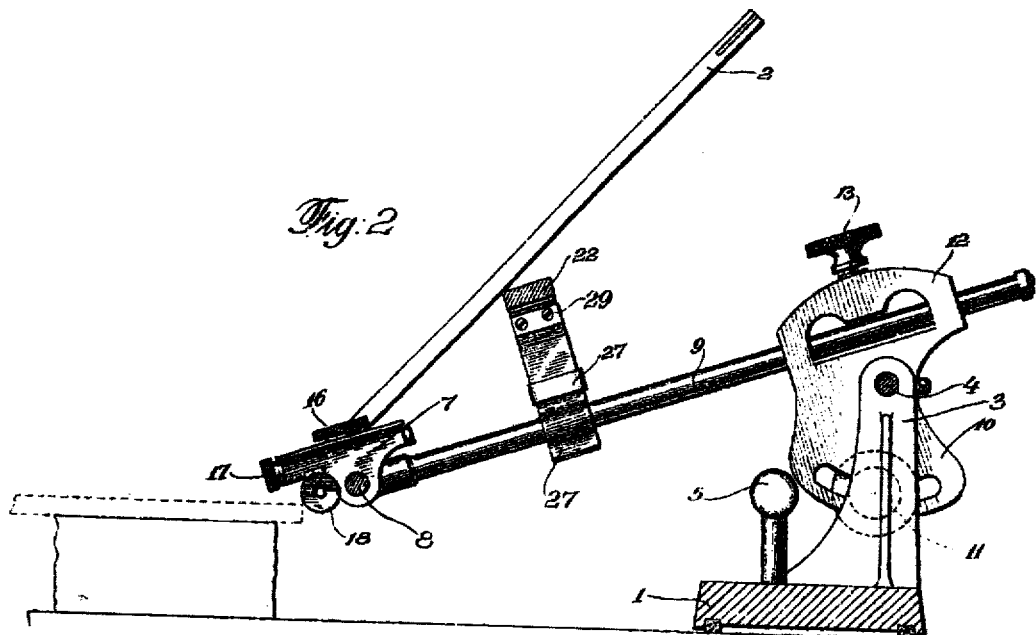
Figure 7:
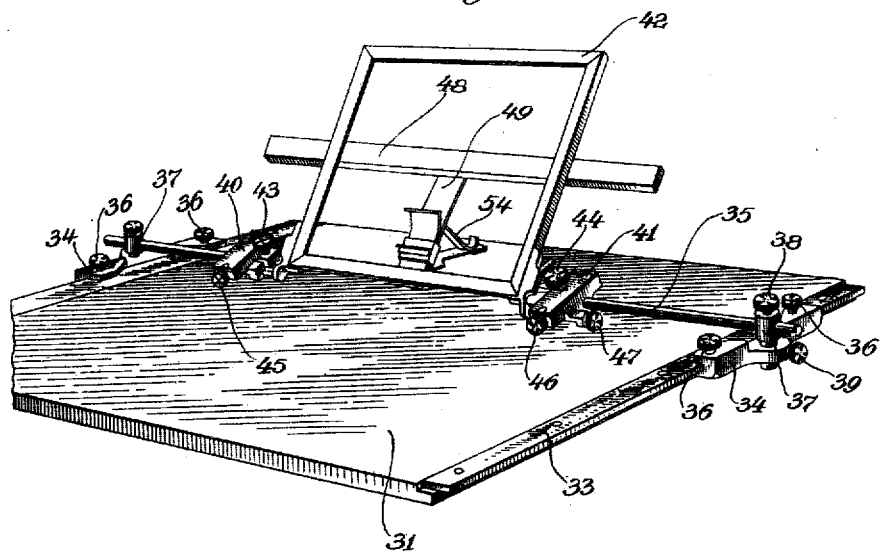
Figure 8:
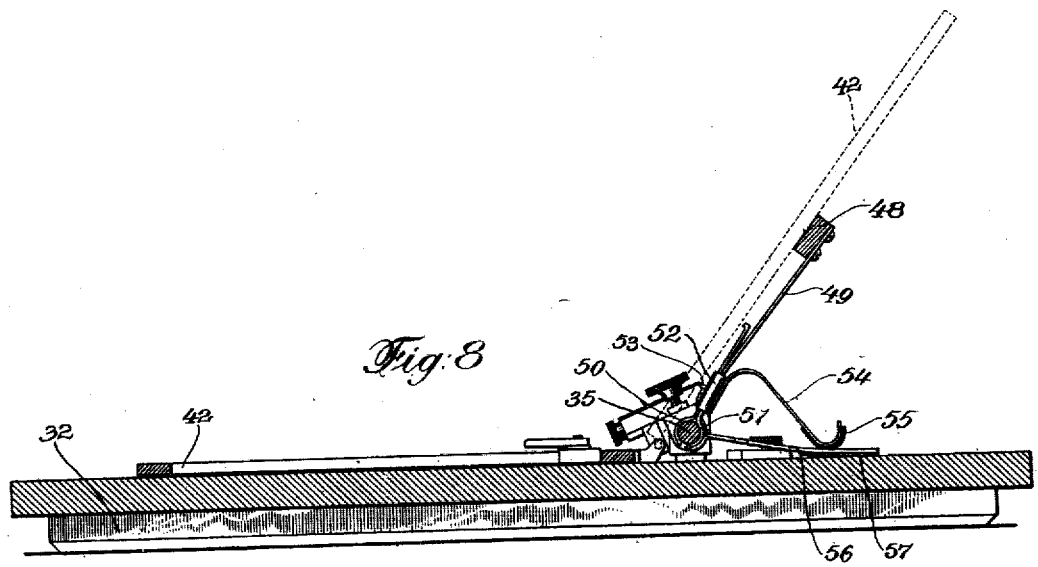

Referring now to the drawings, Figure 1 is a view in perspective of my film frame rest applied to a hold fast in which is mounted a printing-film frame. Fig. 2 is a transverse sectional view of the hold fast, printing-film frame and film frame rest. Fig. 3 is a detailed view illustrating one of the carriages in which one end of the film frame is mounted. Fig. 4 is a sectional elevation showing the film frame rest. Fig. 5 is a detail showing the film frame rest with one of the clamps secured to the end thereof. Fig. 6 is a section on the line shown in Fig. 5. Fig. 7 illustrates another embodiment of my invention and Fig. 8 is a sectional view of the embodiment of the invention illustrated in Fig. 7.

Referring now to Fig. 1, I have illustrated, my improved film frame rest applied to a hold fast, the hold fast carrying a printing-film frame and arranged to work on a lithographic stone. The hold fast has the usual support or base 1 on which the devices for holding the printing-film frame 2 are mounted. From the support 1 rise the standards 3, a rod 4, connecting the standards. Handles 5 are provided as usual to carry the hold fast from place to place. The printing-film frame is carried by two carriages 6 and 7 which in turn are mounted upon cross rod 8. This rod is secured to two adjustable side rods 9. The side rods 9 are mounted in sector wings 10, which are pivotally mounted on the standards 3. The clamping screws
11 hold the wings in the positions which they assume when the cross rod 8 is raised and lowered to adjust the film to the surface of the stone. Boxes 12 are provided on top of the sector wings 10, through which boxes the side rods 9 slide. Clamp screws 13, are used to hold the side rods in their adjusted positions in the boxes.

The carriages 6 and 7, which are of the usual form, are provided with the pintles 14 and 15 respectively. Each carriage may be fastened in place on the cross rod 8 by means of a locking screw 16.

The usual threaded screws provided with protractor wheels 17 are mounted on the carriages. These afford a micrometric adjustment of the film frame toward and from the cross rod 8. The pintle 15 is also provided with the usual screw thread and protractor wheel 18. By rotating this protractor wheel, the pintle may be moved and thus adjust the printing-film in a direction parallel to the cross rod 8.

The printing-film frame is mounted in the frame clamps 19 and 20 as usual. A lever 21 when turned firmly secures the frame clamp to the printing-film frame.

Referring now to my improved film frame rest, I will first describe the form of the rest illustrated in Figs. 1 to 6. I provide a bar 22 which is arranged parallel to the printing-film frame. This bar supports the film film frame, when the latter is turned up from the work, when occasion therefor arises, as in inspecting the progress of the work done by the printing film on the stone.

The bar 22 is provided with a plurality of clamps 23 to which the bar is secured. Each clamp is preferably provided with means for detachably securing it to the support. These means may be widely varied. In Figs. 1 to 6, I show the clamp as comprising or including a pair of metal legs 24 and 25, the ends of which are rounded as shown at 26, so as to embrace the side rods 9 attached to the support on which the devices for carrying the printing-film frame are mounted. The legs are arranged to spring apart and may be drawn together by a metal collar 27 surrounding each pair of legs. In order to facilitate moving the collar up and down, a lip 28 is provided on the collar. The clamps in one embodiment of the invention are pivotally connected to the bar 29. Projections 30 are provided, preferably one for each clamp against which the bar is adapted to abut. These projections serve as stops which, by impinging against the bar, hold the bar rigidly in place so as to afford a firm support for the printing-film frame when the latter is thrown back. It will be observed that the clamps 23 may be folded lengthwise of the bar 22, when the latter is removed from the support, which is convenient for packaging the film rest for shipment.

Referring now to the embodiment of my invention illustrated in Figs. 7 and 8, the film frame rest is attached to the form of the device utilizing printing-films, in which a zinc or other thin plate or drawing paper carries the design to be shaded by means of the film. Support 31 rests upon feet 32 and carries the zinc plate on which the design is placed. Ribs 33 are attached to the sides of the support 31 and form guides for carriages 34 which carry the transverse rod 35. The carriages 34 are clamped in place on the ribs 33 by means of thumb screws 36. A post 37 which turns in the carriages 34, carries the rod 35 which is clamped to the post by the set screw 38. Post 37 may be held in place by the set screws 39. Post 37 may also be raised or lowered to adjust the bar and film to the height of any drawing surface. Carriages 40 and 41 are adjustably mounted to slide on the rod 35, and are provided with the usual pintles to engage and support the printing-film frame 42, so that the latter may be swung toward and from the work on the zinc plate. Set screws 43 and 44 hold the carriages 40 and 41 in their place on the rod 35. The usual micrometric adjusting devices 45, 46 and 47 are provided for nicely adjusting the printing-film frame to the work.

My improved film frame rest when adapted for the style of film frame holder illustrated in Figs. 7 and 8 comprises a bar 48 arranged parallel to the printing-film frame 42 and adapted to support the said frame when the latter is thrown up from the work. The bar is attached to a clamp 49 which is provided with means for detachably securing the bar to the support. This means may be widely varied. I have shown for this purpose a pair of metal legs 50 and 51 which embrace the rod 35. A sleeve 52 provided with a finger piece 53 surrounds the legs 50 and 51, thus permitting the clamp to be clamped on the rod 35 or disengaged therefrom at will. I prefer to support the bar 48 in a yielding manner so that the film frame does not jar the parts of the device when the frame is laid against the bar 48. For this purpose, I make use of a spring metal foot 54 covered with felt 55 at the end, which in turn rests upon a strip 56, provided with a facing 57 of paper, felt or other material. The paper-faced strip 56 may rest upon the zinc plate, drawing paper or other material on which the work is being carried out. It will be understood that in working upon zinc or paper, the sheet of zinc or paper often extends under the bar 35 and beyond the metal strip 56. By thus attaching the bar 48 to its support 31 in a yielding manner, there is no tendency by constant jarring, to move the rod 35 in its fastenings nor to abrade the drawing by contact with the metal foot and strip which support the clamp for the bar.

My improved forms of film frame rests, it will be seen, protect the printing-film from injury as it is thrown up from the work and prevent the film from striking against parts of the film support or against tools, etc. that may have been negligently placed near the back of the film support. These film frame rests also prevent jarring the micrometric adjusting devices for the film supports which accurately and delicately adjust the printing-film, since the film frame does not strike against the locking screws on the rods which carry the film rest nor against any part connected with the micrometric adjusting devices. The film frame rests are independent supports that support the film frame independently from the pintles on the rods.

Having thus described my invention, it will be obvious that many changes may be made by the manufacturer or artisan employed to carry the invention into effect without departing from the principle of the invention.

What I claim and desire to secure by Letters Patent is:—

1. The combination of a support, a printing-film frame mounted to swing with relation to said support, adjusting devices for adjusting said frame, a bar arranged parallel to said frame, means for securing said bar to said support, said film frame resting against said bar when swung away from the work whereby jarring of the adjusting devices is avoided.

2. The combination of a support, a printing-film frame pivotally mounted to swing with relation to said support, a bar acting as a film frame rest and a clamp to which said bar is secured.

3. The combination of a support, a rod carried by said support, a printing-film frame mounted to swing with relation to said support, a bar acting as a film frame rest and a clamp for detachably securing said bar to said rod.

4. The combination of a support, a printing-film frame pivotally mounted to swing with relation to said support, a bar arranged parallel to said frame, a clamp to which said bar is secured, said clamp comprising a pair of legs and a collar surrounding said legs.

5. A film frame rest for printing-film frames, said rest being adapted to be detachably secured to a support, and comprising in combination, a bar, a clamp to which said bar is secured, said clamp being provided with means for detachably securing it to the support.

6. A film frame rest for printing-film frames, said rest being adapted to be detachably secured to a support, a clamp to which said rest is secured, said clamp comprising a pair of legs and a collar surrounding said legs.

7. A film frame rest for printing-film frames comprising in combination a bar, a pair of clamps each hinged to said bar, each clamp including a pair of metal legs, a collar surrounding each pair of legs, and a projection on one of said clamps adapted to abut against said bar.

8. A film frame rest for printing-film frames comprising a bar, hinged clamps attached to said bar, projections on said clamps adapted to abut against said bar and hold said bar in position, each clamp consisting of a pair of spring jaws, and lipped sliding collars, one for each pair of jaws.

9. The combination of a support, a printing film frame adapted to swing with relation to said support, carriages on which said frame is mounted, a bar, and means independent of said carriages, whereby said bar is adapted to support said film frame when the latter is swung away from the work.

10. The combination of a support, a printing film frame adapted to swing with relation to said support, carriages on which said frame is mounted, micrometric adjusting devices mounted on said carriages for adjusting said frame, a bar and means for securing said bar to said support independently of said carriages, said bar being adapted to support said film frame when the latter is swung away from the work.

In testimony whereof, I have signed my name to this specification, in the presence of two subscribing witnesses.

BENJAMIN DAY.

Witnesses:
EMERY DECKER,
ELLEN L. PALMER.